United States Patent [19]
Allen

[11] Patent Number: 6,074,552
[45] Date of Patent: Jun. 13, 2000

[54] ELECTRICAL SWITCH

[75] Inventor: Jeffrey Kenneth Allen, Warrington, United Kingdom

[73] Assignee: Trumeter Company Ltd., Manchester, United Kingdom

[21] Appl. No.: 09/097,125

[22] Filed: Jun. 12, 1998

[30] Foreign Application Priority Data

Apr. 24, 1998 [GB] United Kingdom ............... 9808823

[51] Int. Cl.⁷ .................. B01D 35/143; H01H 43/00; H01H 1/12
[52] U.S. Cl. .................. 210/138; 210/100; 200/50.1; 368/9
[58] Field of Search ................... 210/85, 87, 94, 210/100, 138, 282; 200/50.1, 61.7, 61, 71; 368/9, 10, 12

[56] References Cited

U.S. PATENT DOCUMENTS

| | | | |
|---|---|---|---|
| 4,127,752 | 11/1978 | Lowthorp | 200/308 |
| 4,398,074 | 8/1983 | Danielson et al. | 200/302 |
| 4,918,270 | 4/1990 | Orrico | 200/302.2 |
| 5,744,033 | 4/1998 | Bertrand et al. | 210/282 |
| 5,823,229 | 10/1998 | Bertrand et al. | 210/138 |
| 5,858,215 | 1/1999 | Burchard et al. | 210/87 |
| 5,888,581 | 3/1999 | Primdahl et al. | 210/138 |

FOREIGN PATENT DOCUMENTS 1 452 324  10/1976  United Kingdom.

*Primary Examiner*—Joseph W. Drodge
*Attorney, Agent, or Firm*—Christensen O'Connor Johnson & Kindness PLLC

[57] ABSTRACT

Electrical apparatus such as a timer for use in a water filter is formed integrally with a sealed housing. The housing has a resilient, depressible surface from which a projection extends. At least an end surface of the projection is electrically conductive. A pair of spaced-apart electrical contacts are located close to the end surface of the projection. Resilient deflection of the depressible surface causes the projection to come into contact with the electrical contacts, thereby making an electrical connection between them.

19 Claims, 3 Drawing Sheets

ELECTRICAL SWITCH

BACKGROUND TO THE INVENTION

1. Field of the Invention

This invention relates to electrical switches and to electrical apparatus including an electrical switch. Particularly, but not exclusively, the apparatus to which the invention relates is a timer device including an electrical switch.

The purpose of a switch is to selectively make or break an electrical circuit. In the past, a vast range of devices has been proposed which serve this purpose.

2. Summary of the Prior Art

Most commonly, a switch is a discreet component that is connected within a circuit during manufacture of an electrical apparatus. Switches of this type often make up a disproportionately large part of the cost of the electrical apparatus of which they are a part because they are expensive components (when compared with, for example, resistors, capacitors and many semiconductor devices) and because their connection within the apparatus adds an extra manufacturing step. Often, such switches fail earlier than other components of an electrical apparatus. This is particularly so where the apparatus operates in a hostile environment because many types of switches cannot be completely sealed against eternal contamination without leading to substantial expense.

One known type of switch comprises two or more exposed conductive pads formed on a printed circuit board, onto which a conductive element can be pressed to complete an electrical circuit between them. The conductive element is typically a graphite-loaded or metallised button, part of which projects from a housing. A user can press on the button to complete the circuit. Such switches are advantageously simple to manufacture, but nonetheless still require an additional component to be provided (the button) and can be subject to contamination where the button projects from the housing.

SUMMARY OF THE INVENTION

It is an aim of the present invention to provide a switch which mitigates some or all of the above problems.

Accordingly, a first aspect of the present invention provides an electrical apparatus which includes an integral switching mechanism.

More specifically, the invention provides an electrical apparatus including a housing having a projection extending away from a depressible surface portion of the housing towards a pair of spaced-apart electrical contacts, the projection being formed integrally with the depressible surface portion of the housing; the projection having an electrically conductive portion, and, in use, when the surface of the housing is depressed, the projection is urged towards the contacts and the electrically conductive portion of the projection electrically connects the contacts.

In this context, 'integral' preferably means that the projection is formed in the same process and form the same material as is the housing.

As the operable portion of the switch is formed integrally with the housing, the switch as a whole is cheaper and easier to manufacture than is the case where additional components must be provided. Furthermore, there is no requirement to provide an aperture in the housing to enable a user to operate the switch. This allows the apparatus to be effectively sealed against environmental contamination.

Preferably the depressible surface portion is a resilient surface that can undergo small elastic deformations when a force is applied thereto. The force required is preferably such that accidental operation of the switch is avoided.

The conductive surface of the projection may be an end surface capable of being brought into electrical contact with the two electrical contacts. Preferably the conductive surface is a metal-loaded resin, more preferably a silver-loaded epoxy resin. The silver-loaded epoxy resin may be applied to the projection by any convenient method after the projection has been formed. Alternatively, at least a portion of the projection may be formed from a conductive material. For example, such material may be a polymer loaded with carbon.

The contacts may conveniently be formed on a printed circuit board. This is a simple and convenient step to carry out during manufacture of the apparatus.

Preferably the housing also includes further electrical components mounted, for example, on a printed circuit board. In apparatus according to the last-preceding paragraph, such further components are for preference mounted on the printed circuit board which also includes on which the two electrical contacts are formed. The further electrical components may include a power source, for example one or more battery cells. The electrical circuit, in a particularly useful embodiment, comprises an electrical timer and more. In such cases, the above-described electrical switch can be used to reset the timer.

The timer may include a display means. Preferably, the display means includes a liquid crystal display.

Preferably the housing encloses the operative components of the switch and more preferably the housing encloses these and further electrical components. The housing may be a sealed unit. This is beneficial because (a) airborne contaminants are prevented from coming into contact with the electrical components and (b) the sealed unit can be made waterproof so that it can be used in situations where the electrical apparatus is likely to be brought into contact with water or other liquids.

From a second of its aspects, the invention provides an electrical apparatus comprising a sealed housing having an external wall, from which wall a projection extends into the housing which projection has an electrically-conductive end face remote from the external wall, there being a circuit board in the housing on which are formed two electrically-conductive pads, arranged such that the external wall can be deflected from a normal state by manual force from externally of the housing to bring the end face into contact with the pads thereby to complete an electrical circuit between them, and such that removal of manual force causes the external wall to revert to its normal state, whereby the electrical circuit between the pads is interrupted.

The external wall and the projection are most preferably formed as a one-piece moulding of plastic material.

A third aspect of the present invention provides a device above which includes an electrical timer as described. Typically, the device includes a component that needs to be changed at regular intervals. For example, the component may be a filter such as a water filter.

The device may be a water container including a water filter, in which the water filter should be changed at regular intervals. In such cases, great advantage can be gained if the timer is a waterproof sealed unit since it is very likely that the timer will come into contact with water.

The electrical timer may be preprogramed to show the remaining recommended life-span of a water filter. Preferably, the above-described switch in the electrical timer can be used to reset the timer when the water filter has been replaced.

People commonly refrigerate water in such water containers. Therefore, it is preferable that the timer can operate at low temperatures, for example at 1 to 5° C.

DETAILED DESCRIPTION OF THE PREFERRED EMBODIMENTS

Figure 1A:
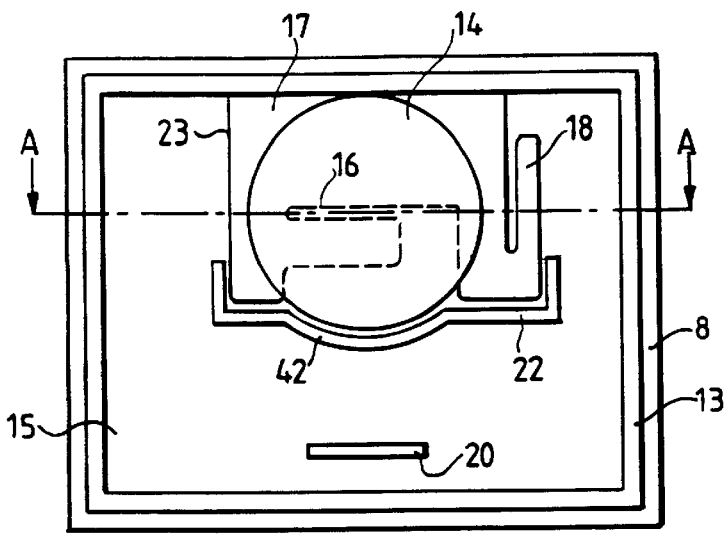
FIG. 1A is a plan view from above of a base and battery assembly of an electrical timer according to the present invention.
Figure 1B:
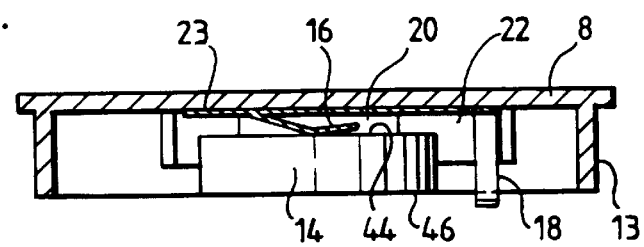
FIG. 1B is a cross sectional view on the line A—A of the assembly of FIG. 1A.

FIGS. 1A and 1B show a lower housing member 8 with a 3V Lithium CR1025 battery cell 14 arranged therein. The lower housing member 8 has a planar rectangular base 15 which has an upstanding flange 13. The flange 13 and a periphery of the base 15 have profiles which are generally complimentary to one another. Upstanding from and integral with the base 15 are a battery retaining member 22 and a PCB support member 20 (described in detail below). The battery retaining member 22 includes an arcuate portion 42 generally complementing an arc of the battery cell body to retain the battery cell 14 in a fixed lateral position within the housing. The remainder of the battery retaining member is adapted to restrain the lateral movement of a battery support 23 (described below).

The lower housing member 8 and all integral components thereof is made, in this embodiment, from injection moulded plastic such a polycarbonate.

The battery cell 14 is supported by the battery support 23 made from a generally rectangular metal (e.g. steel) blank. The blank is stamped to provide a first battery contact 16 in contact with a first terminal face 44 of the battery cell 14. The first battery contact urges a second terminal face 46 of the battery cell 14 into contact with a first battery contact portion (not shown) of a printed circuit board 10 (shown in FIGS. 2a and 2b and described in detail below). The battery support 23 also includes an elongate printed circuit board contact 18 which extends from a main body portion 17 of the battery support 23 to make electrical contact with a second battery contact portion (not shown) of the printed circuit board 10.

Figure 2A:
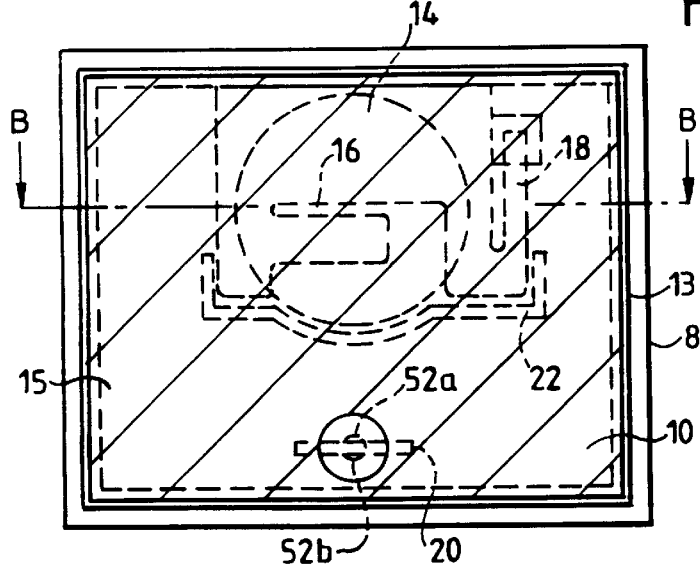
FIG. 2A is a plan view from above of the assembly of FIG. 1A including a printed circuit board (PCB).
Figure 2B:
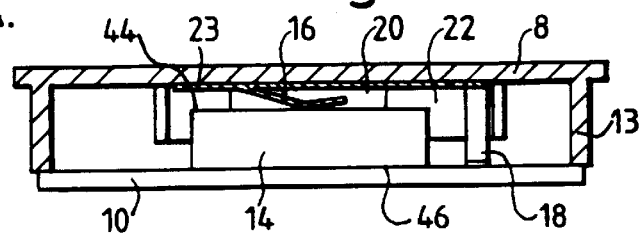
FIG. 2B is a cross sectional view on the line B—B of the assembly of FIG. 2A.

FIGS. 2A and 2B show the printed circuit board 10 supported by the flange 13 of the lower housing member 8.

The printed circuit board 10 is located on the flange 13 such that the two battery contact portions (not shown) of the printed circuit board are electrically connected to a respective battery terminal face 44, 46.

The printed circuit board 10 contains electrical components and circuitry to enable it to function as a countdown timer and to indicate via a liquid crystal display unit 12 the current status of the time. The production and assembly of such electrical components and circuitry is within the common general knowledge of a skilled person and therefore it is not necessary to describe herein the layout of the printed circuit board in detail.

Figure 3A:
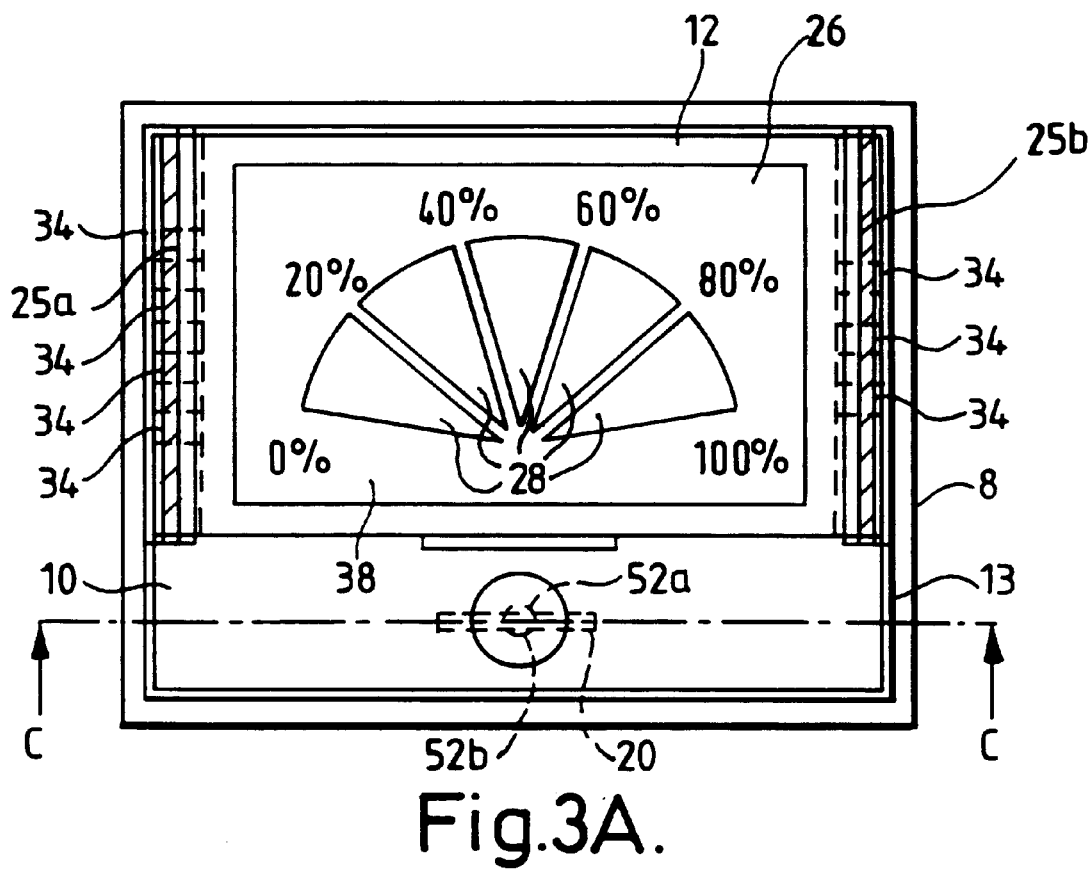
FIG. 3A is a plan view from above of the assembly of FIG. 2A including a liquid crystal display (LCD) assembly.
Figure 3B:
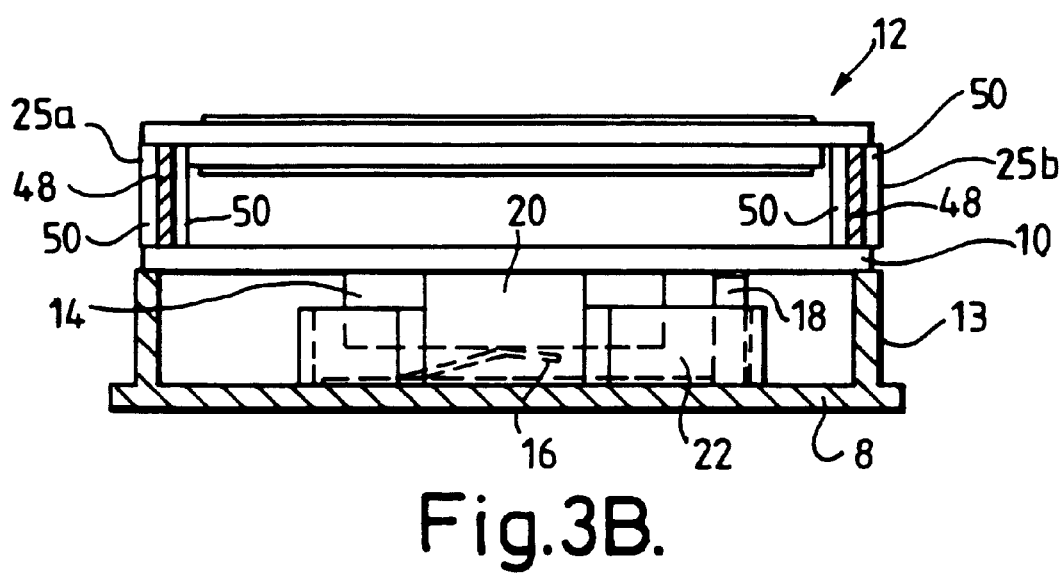
FIG. 3B is a cross sectional view on the line C—C of the assembly of FIG. 3A.

As seen in FIGS. 3A and 3B the printed circuit board 10 is connected via two LCD contact members 25a, 25b to a liquid crystal display unit 12. The LCD contact members 25a, 25b consist of a central connecting layer 48 sandwiched between two resilient outer layers 50. The circuit board 10 supports the liquid crystal display unit 12 via contact members 25a, 25b. The display unit 12 is disposed substantially directly above the circuit board 10.

In the present example, the LCD contact member 25a, 25b are connected to two opposite sides of the liquid crystal display unit 12. One of the contact members 25a is connected to four pins of the display unit 12 and the other contact member 25b is connected to three pins, the pins controlling the display as follows:

| Pin | Function |
|---|---|
| 1 | Common |
| 2 | 0% |
| 3 | 20% |
| 4 | 40% |
| 5 | 60% |
| 6 | 80% |
| 7 | 100% |

However, a skilled person will appreciate that the liquid crystal display unit 12 and the method by which it is controlled by the circuit board 10 is well known in the art and any suitable liquid crystal display unit 12 can be selected and connected as required.

The liquid crystal display unit 12 includes a liquid crystal display 26 as shown in FIG. 3A. The display 26 indicates the remaining lifetime of the water filter element (not shown) by way of graphical representation. The display 26 indicates the filter status through a combination of segments of a circle and numerical representations.

Figure 4A:
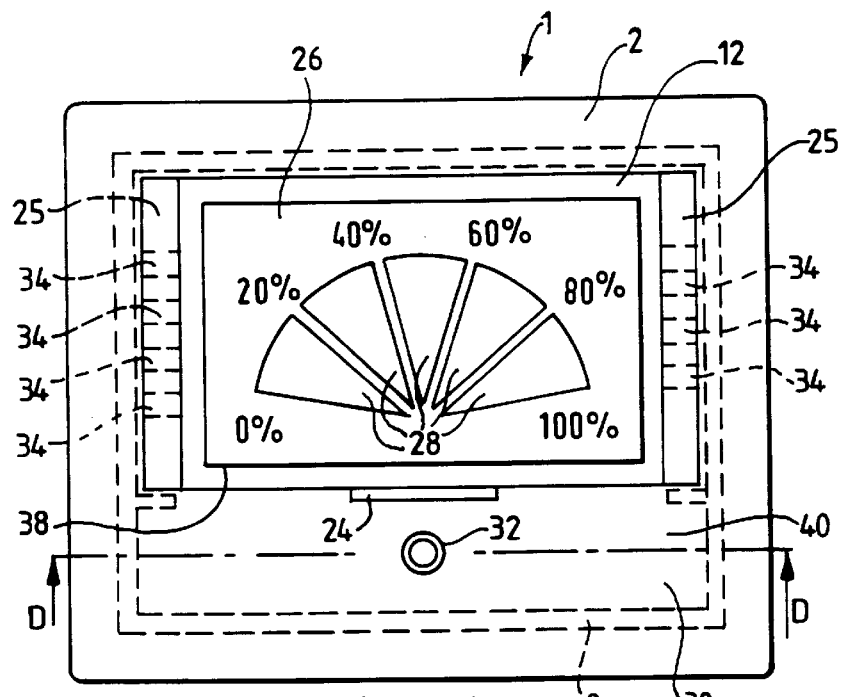
FIG. 4A is a plan view from above of a complete electrical timer assembly.
Figure 4B:
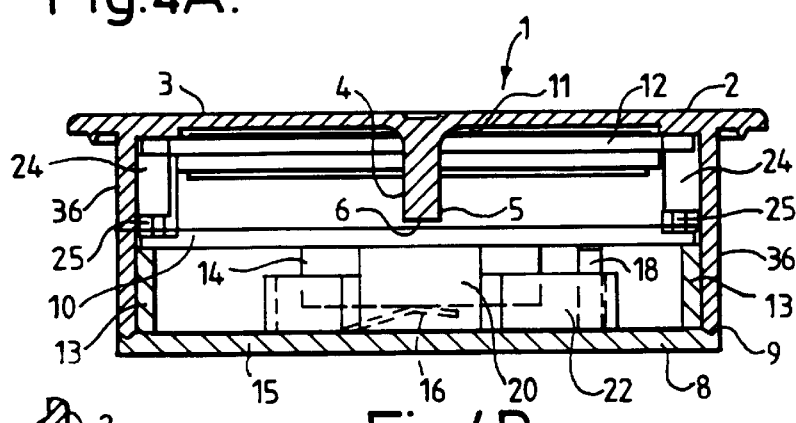
FIG. 4B is a cross sectional view on the line D—D of the electrical timer assembly of FIG. 4A.
Figure 4C:
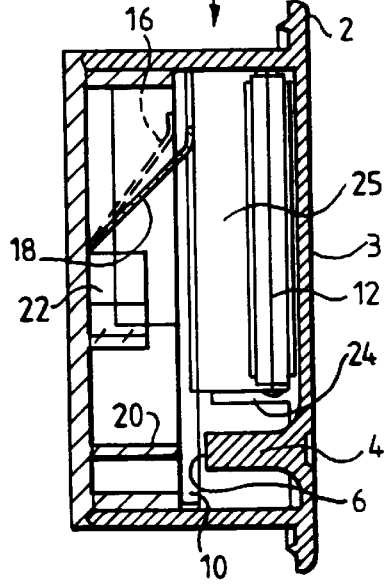
FIG. 4C is a side elevational view of the electrical timer assembly of FIG. 4A.

To retain the liquid crystal display unit 12 and printed circuit board in the correct orientation relative to each other and the lower housing member 8, an upper housing member 2 is connected to the lower housing member such that a combination of the upper housing member 2 and lower housing member 8 encloses the remaining timer unit components. This can be seen from FIGS. 4a, 4b and 4c.

The upper housing member 2 consists of a rectangular cover 3 with side walls 36 dependent therefrom. A projection 4 is integral with the cover 3. The projection 4 protrudes from an interior surface of the cover 3 such that an end surface 5 of the projection 4 is disposed directly above two contacts 52a, 52b (shown in FIGS. 3A and 4A–4C) formed on the printed circuit board 10. There is a separation of about 0.5 mm between the contacts 52a, 52b and the end surface 5. The end surface 5 of the projection 4 has a thin conducting layer of silver loaded epoxy resin 6 applied to it.

The side walls 36 are ultrasonically welded to the outer edge of base 15 to form a weld 9 between the upper and lower housing members. The flange 13 is configured such that it has an exterior surface adjacent to an interior surface of side walls 26. The resulting timer unit 1 is therefor sealed and water-proof.

A transparent window portion 38 of the cover 3 is provided adjacent to the liquid crystal display unit 12 so that the liquid crystal display 26 is visible through the window portion 38. Surrounding the window 38 is an opaque border 40. A marking 32 is provided on the opaque border 40 to indicate to an operator the position of the projection 4. At the marked position, the operator can apply a force (typically, by pressing it with a finger) to depress the projection 4 into electrical contact with the two contacts 52a, 52b to make a circuit between them. The PCB support member 20 abuts the circuit board 10 directly below the contacts 52a, 52b to prevent extensive force from the projection 4 distorting and damaging the circuit board 10. When the operator removes the force, the cover 3 springs back to its original position, such that the projection 4 is once again displaced from the contacts 52a, 52b, thereby breaking the circuit between them.

The interior surface of cover 3 exerts a small force on the liquid crystal display unit 12 which in turn compresses the resilient contact members 25.

Two LCD supports 24 extend from the interior surface of the cover 3 and abut the contact members 25 thus preventing lateral movement of the liquid crystal display unit 12.

In use, the timer unit is initially reset by applying a force to the indicated position on the opaque border 40 of the cover 3. This depresses the projection 4 and the conductive end surface 5 of projection 4 electrically connects the two contacts 52a, 52b. This resets the liquid crystal display unit 12. The liquid crystal display 12 will then show all five segments 28 indicating that the filter is relatively new. As time passes the remaining lifetime of the filter decreases and this is displayed on the liquid crystal display 26 by a reducing number of segments 28. When the recommended lifetime of the filter has expired, the liquid crystal display 26 will indicate this by displaying none of the segments. The operator should then change the filter and reset the timer as detailed above.

Although the presently described embodiment relates to a timer unit for water filters, it is equally applicable to any filter component having a limited lifetime and more generally to any component which has a limited lifetime and should be changed regularly.

What is claimed is:

1. Electrical apparatus comprising:
   a housing having a depressible surface portion;
   a pair of spaced-apart electrical contacts;
   wherein the housing has a projection extending into the housing away from the depressible surface portion of the housing toward the pair of spaced-apart electrical contacts, the projection being formed integrally with and from the same material as the depressible surface portion of the housing such that the depressible surface portion of the housing and the projection are formed as a one-piece construction; the projection having an electrically conductive end surface whereby, when the surface of the housing is depressed, the projection is urged toward the electrical contacts and the electrically conductive end surface of the projection electrically connects the contacts.

2. Electrical apparatus according to claim 1 in which the depressible surface portion is a resilient surface that can undergo elastic deformations when a force is applied thereto.

3. Electrical apparatus according to claim 1 in which the conductive end surface is formed of a metal-loaded resin.

4. Electrical apparatus according to claim 3 in which the metal-loaded resin is a silver-loaded epoxy resin.

5. Electrical apparatus according to claim 4 in which the silver-loaded epoxy resin is applied to the projection after the projection has been formed.

6. Electrical apparatus according to claim 1 in which said material is a polymer loaded with carbon.

7. Electrical apparatus according to claim 1 in which at least one of the contacts is formed on a printed circuit board.

8. Electrical apparatus according to claim 1 which further includes electrical components on a printed circuit board.

9. Electrical apparatus according to claim 8 in which said electrical components and the electrical contacts are on the same printed circuit board.

10. Electrical apparatus according to claim 9 in which the further electrical components include a power source.

11. Electrical apparatus according to claim 8 in which the housing encloses the electrical contacts, the projection, and said further electrical components.

12. Electrical apparatus according to claim 11 in which the housing is a sealed unit.

13. Electrical apparatus according to claim 1 in which the electrical circuit includes an electrical timer.

14. Electrical apparatus according to claim 13 in which the interconnection of the electrical contacts by the electrically conductive end surface of the projection is operable to reset the timer.

15. Electrical apparatus according to claim 13 further including a display means.

16. Electrical apparatus comprising a sealed housing having an external wall, from which wall a projection extends into the housing, which projection has an electrically conductive end face remote from the external wall, there being a circuit board in the housing on which are formed two electrically conductive pads, arranged such that the external wall can be deflected from a rest state by a manual force from externally of the housing to bring the end face into contact with the pads to thereby complete an electrical circuit between them, and such that removal of said manual force causes the external wall to revert to its rest state, whereby the electrical circuit between the pads is interrupted.

17. Electrical apparatus according to claim 16 in which the external wall and the projection are formed as a one-piece molding of plastic material.

18. Water filtration apparatus, comprising:
   a water container,
   a water filter having a filter element which must be changed at regular intervals, and
   a timer contained within a housing, which housing has a depressible surface; and the timer includes a circuit board on which a pair of spaced-apart electrical contacts are formed, electrical interconnection of said contacts operating to cause the timer to reset; wherein the housing has a projection extending into the housing away from the depressible surface portion of the housing toward the pair of spaced-apart electrical contacts, the projection being formed integrally with and from the same material as the depressible surface portion of the housing such that the depressible surface portion of the housing and the projection are formed as a one-piece construction; the projection having an electrically conductive end surface whereby, when the surface of the housing is depressed, the projection is urged toward the electrical contacts and the electrically conductive end surface of the projection electrically connects the contacts, thereby causing the timer to reset.

19. Water filtration apparatus according to claim 18 in which the timer is preprogrammed to show the remaining recommended life-span of the filter element, the interconnection of the electrical contacts by the electrically conductive end surface of the projection in the timer being used to reset the timer when the water filter has been replaced.

* * * * *

UNITED STATES PATENT AND TRADEMARK OFFICE
CERTIFICATE OF CORRECTION

PATENT NO.  : 6,074,552
DATED       : June 13, 2000
INVENTOR(S) : J.K. Allen

It is certified that error appears in the above-identified patent and that said Letters Patent is hereby corrected as shown below:

COLUMN        LINE

[56]              Refs. Cited      after the entry for U.S. Patent No. 4,918,270, insert
Pg. 1, col. 2     (U.S. Patents,   the following line:
                  Item 4)          --5,612,520  3/1997  Toedtman et al. --

Signed and Sealed this

First Day of May, 2001

Attest:

NICHOLAS P. GODICI

*Attesting Officer*        *Acting Director of the United States Patent and Trademark Office*